United States Patent Office — 3,445,518 — Patented May 20, 1969

3,445,518
p-ACYLPHENYLETHYLAMINES

John Shavel, Jr., Menham, and George Bobowski, Morristown, N.J., assignors to Warner-Lambert Pharmaceutical Company, Morris Plains, N.J., a corporation of Delaware
No Drawing. Filed May 6, 1966, Ser. No. 548,037
Int. Cl. C07c 87/28; C07d 13/00; A61k 27/00
U.S. Cl. 260—570.8         9 Claims

ABSTRACT OF THE DISCLOSURE

A class of p-acylphenylethylamines are described. These amines have the following structural formula:

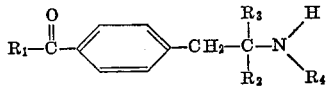

wherein $R_1$ is lower alkyl, cycloalkyl or aralkyl, and $R_2$, $R_3$ and $R_4$ are hydrogen or lower alkyl.

These compounds are useful as sympathomimetic amines.

---

This invention relates to p-acetylphenylethylamines of the formula:

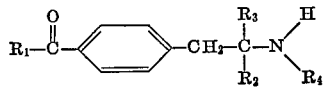

wherein $R_1$ represents a lower alkyl group such as methyl, ethyl, propyl, isopropyl, butyl and isobutyl; a cycloalkyl group such as cyclohexyl, cyclopentyl and cyclopentylmethyl; aralkyl such as phenyl lower alkyl in which lower alkyl has the same meaning as defined above and $R_2$, $R_3$ and $R_4$ each represents hydrogen or lower alkyl such as methyl, ethyl, propyl, isopropyl and the like.

The symbols $R_1$, $R_2$, $R_3$ and $R_4$ used hereinafter have the same meaning as defined.

This invention also includes within its scope a novel process for the production of these novel acylphenylethylamines.

The compounds of this invention exhibit analgesic and anorectic activities.

A novel property of the compounds of this invention resides in the fact that the l-isomer of p-acetyl-desoxyphedrine lowers the serotonin level in animal brains. On the other hand, the corresponding d-isomer or the d,l-racemate does not exhibit such activity in animal brains.

The l-isomer compounds of this invention although structurally resembling sympathomimetic amines and having the same safety margin as amphetamine are a unique class of psychotherapeutic agents because of their ability to lower brain serotonin levels, a property exhibited by structurally unrelated therapeutic substances such as the reserpine alkaloids, or other therapeutic substances such as tetrabenzazine, Accordingly, these compounds may be used as mood elevators or as tranquilizers.

Another unique property of these compounds resides in the fact that the l-form is active in lowering serotonin level whereas the d-form or the d,l-racemate is inactive.

In contrast, in the sympathomimetic amine, the d-form is active whereas the l-form is generally inactive. For example, l-amphetamine is not as active as a sympathomimetic amine as the corresponding d-isomer.

It has also been found that in order to obtain this unexpected lowering of brain serotonin level in animal brains at least one hydrogen atom is required to be attached to the nitrogen atom. For example, when N,N-dilower alkyl substitution has been effected, this activity is entirely eliminated.

In use, these compounds either in the form of their free base or in the form of the corresponding acid addition salts are combined with an inert pharmaceutical diluent to form dosage forms such as tablets, capsules, solutions for parenteral injection and the like, with the active ingredient being present from about 0.5 to 50 mg. per dosage unit. In addition, these compounds may also be combined with other known therapeutic agents such as steroids, antacids, analgesics, tranquilizers and the like to enhance and broaden their therapeutic spectrum.

According to the process of this invention, these novel p-acylphenylethylamines are produced by treating D or L or DL phenylethylamines with an aliphatic acyl chloride in the presence of excess aluminum chloride. Generally speaking, an excess of acyl chloride is employed and the reaction is effected between a temperature range of about 30 to 70° C. in an inert solvent such as nitrobenzene. Suitable acyl chlorides for this reaction are lower aliphatic acyl chlorides such as acetyl chloride.

This reaction is surprising because one would expect deactivity of the aromatic nucleus by the aminoethyl group and no acylation is effected. In fact, we have found that with catalysts such as borontrifluoride which are frequently employed for acylation, no such acylation can be demonstrated. The acylated amine may be treated with acids such as hydrochloric, hydrobromic, sulfuric, phosphoric and nitric to form the corresponding acid addition salts by conventional procedures. These salts are also within the scope of this invention.

The following examples are included in order further to illustrate the invention. Temperature is given in degrees centigrade. Room temperature referred to in these examples is about 20° to about 30° C.

EXAMPLE 1

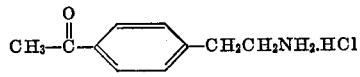

β-(p-acetylphenyl)ethylamine hydrochloride (4'-(2-aminoethyl)acetophenone hydrochloride)

To a stirred mixture of 267 g. of anhydrous aluminum chloride in 250 ml. of nitrobenzene is added 118 g. of acetyl chloride dropwise being accompanied by a temperature rise to 40°. β-Phenethylamine (60.5 g.) is then added dropwise over a period of thirty minutes, allowing the temperature to rise to 50°. After heating the reaction mixture for thirty minutes at 70°, and then maintaining at 25° for two hours, the reaction mixture is poured onto 2 kg. of crushed ice and extracted twice with 500 ml. of ether. The ethereal extracts, containing the nitrobenzene and some amide are discarded. The aqueous phase is made basic with concentrated sodium hydroxide at 0° and extracted twice with 500 ml. of chloroform. The combined chloroform extracts are dried over sodium sulfate, and the solvent is removed in vacuo. The residue is dissolved in a minimum amount of ethanol, methanolic hydrogen chloride is added, followed by the addition of ether until turbidity occurs. After cooling, the precipitate is filtered off and recrystallized from ethanol, giving 7.6 g. of β-(p-acetylphenyl)ethylamine hydrochloride in the form of crystals, M.P. 179–185°. Addition of ether to the mother liquor gives a second crop which, after recrystallization from ethanol, yields additional 6.7 g. of crystalline β-(p-acetylphenyl)ethylamine hydrochloride, M.P. 195–199°. The combined crops are recrystallized three times from ethanol, giving analytically pure, white crystals, M.P. 203–205°.

Analysis for $C_{10}H_{14}NOCl$: Calcd.: C, 60.15; H, 7.07; N, 7.02; Cl, 17.76. Found: C, 60.34; H, 7.11; N, 7.22; Cl, 17.60, 17.49.

Infrared characteristic spectra, $\nu_{max}^{Nujol}$: 1686 (v.s.), 1416 (m.), 1186 (m.), 848 (s.), 827 (s.) cm.$^{-1}$.
U.V. spectra, $\lambda_{max}^{EtOH}$: 246.5 mμ (ε=15,500); shoulder: 275 mμ (ε=1,300); min.: 218 mμ (ε=2,050); $\lambda_{max}^{H_2O}$: 251 mμ, (ε=15,100); λ min.: 220 mμ, (ε=2,400).

Procedure B

Nitrobenzene (123 ml.) is added to 99 g. of anhydrous aluminum chloride with stirring causing the temperature rise to 55°. Upon cooling to 10°, 58.5 g. of acetyl chloride is added followed by the dropwise addition of β-phenethylamine over a period of thirty minutes. After one hour at 25°, the contents are poured onto one liter of crushed ice and extracted three times with 250 ml. of ether. The extracts are discarded. The aqueous layer is made basic with conc. sodium hydroxide at 0° and extracted three times with 150 ml. of chloroform. The combined extracts are washed with water, dried over anhydrous sodium sulfate, and the solvent is removed in vacuo, leaving a golden colored oil, which solidifies on standing. To the solution of this residue in 100 ml. of absolute ethanol is introduced hydrogen chloride gas to a pH of 1.0. Cooling and filtration gives 17.5 g. of β-(p-acetylphenyl)ethylamine hydrochloride as white crystals, M.P. 196–199°. Further concentration of the mother liquor to ca. 60 ml. and cooling gives 7.4 g. of white crystals, M.P. 194–198°.

EXAMPLE 2

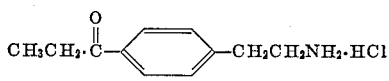

β-(p-propionylphenyl)ethylamine hydrochloride (4′-(2-aminoethyl)propionphenone hydrochloride)

To the stirred solution of 100 g. of anhydrous aluminum chloride in 150 ml. of nitrobenzene is added 69 g. of propionyl chloride at 20° followed by the dropwise addition of 30.5 g. of β-phenethylamine over a period of thirty minutes. After the reaction mixture is stirred for three hours at room temperature and then at 30–35° for five hours, the subsequent paper chromatography (heptane 3/acetone 1/NH₃; Rf=0.64 to 0.68) shows complete reaction. The contents are poured onto 500 g. of crushed ice and extracted twice with 200 ml. of U.S.P. ether. The aqueous layer is made basic with concentrated sodium hydroxide at 0°, and is extracted twice with 300 ml. of chloroform. The chloroform extract is washed with water, dried over sodium sulfate, and the solvent is removed in vacuo. To the residue, dissolved in 200 ml. of absolute ethanol, is introduced hydrogen chloride gas to a pH of 2.0. After chilling, 19.5 g. of β-(p-propionylphenyl)ethylamine hydrochloride as off-white crystals, M.P. 225–229° is obtained. Recrystallization of this material from ethanol gives 12.0 g. of analytically pure off-white flakes, M.P. 227–230°.

Analysis for $C_{11}H_{16}NOCl$: Calcd.: C, 61.82; H, 7.55; N, 6.55; Cl, 16.59. Found: C, 61.56; H, 7.22; N, 6.40; Cl, 16.48.

Infrared spectra, $\nu_{max}^{Nujol}$: 1690 (v.s.); 1415 (s.); 1352 (w.); 1225 (s.); 1202 (w.); 1181 (m.); 850 (s.); 795 (v.s.) cm.$^{-1}$.
U.V. spectra, $\lambda_{max}^{EtOH}$: 247 mμ (15,000); shoulder: 283 mμ (1,050); min.: 220 mμ (2,250).
$\lambda_{max}^{H_2O}$: 250 mμ, (15,150), λ min: 220 mμ, (1,450).

EXAMPLE 3

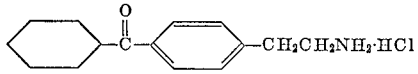

p-Cyclohexylcarbonylphenethylamine hydrochloride (p-(2-aminoethyl)phenyl cyclohexyl ketone hydrochloride)

β-Phenylethylamine (25.5 g.) is added at 30° to the stirred solution of 29.0 g. of cyclohexylcarbonyl chloride and 75.0 g. of anhydrous aluminum chloride in 100 ml. of nitrobenzene and allowed to stir for four hours at room temperature. Additional quantities of 50.0 g. of aluminum chloride, 9.0 g. of cyclohexylcarbonyl chloride and 100 ml. of nitrobenzene are added and continued to stir at 40–55° for four hours. The dark reaction mixture is poured onto crushed ice, extracted three times with 250 ml. of ether, and the extracts are discarded. The aqueous part is made basic with sodium hydroxide and extracted three times with 350 ml. of methylene chloride. The combined extracts are dried over sodium sulfate and the solvent is removed in vacuo. To the oily residue is added 100 ml. of 95% ethanol, 21 g. of trimethylaminoacetohydrazide chloride, and 25 ml. of glacial acetic acid and the solution is refluxed for three hours. After concentration of the solvent to a low volume, the mixture is poured onto ice, made basic with sodium hydroxide and extracted twice with 200 ml. of ether, the extracts being discarded. The aqueous part is neutralized, 15 ml. of concentrated hydrochloric acid is added and heated on a steam bath for two hours. The solution is made basic with sodium hydroxide and extracted three times with 200 ml. of methylene chloride. The combined extracts are dried over sodium sulfate and the solvent is removed in vacuo. The residual oil is taken up with 80 ml. of acetonitrile, hydrogen chloride is introduced to a pH of 2.0 to give, after cooling, 10.68 g. of off-white crystals, M.P. 185–187°. Recrystallization from acetonitrile-methanol and treatment with charcoal gives 6.54 g. of analytically pure p-cyclohexylcarbonylphenethylamine hydrochloride as white crystals, M.P. 216–220°. Concentration of the mother liquor to a low volume gives 2.52 g. of p-cyclohexylcarbonylphenethylamine hydrochloride as off-white crystals M.P. 215–218°.

Analysis for $C_{15}H_{21}NO \cdot HCl$: Calcd.: C, 67.27; H, 8.28; N, 5.23; Cl, 13.24. Found: C, 67.46, 67.56; H, 8.35, 8.40; N, 4.98; Cl, 13.46, 13.38.

U.V. spectra $\lambda_{max}^{EtOH}$: 247 mμ (ε=15,400). λ min: 220 mμ (ε=2,700).
Infrared spec, $\nu_{max}^{Nujol}$: 832 (m.); 846 (m.); 1612 (m.); 1681 (v.s.) cm.$^{-1}$.

EXAMPLE 4

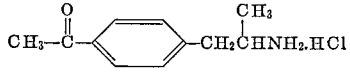

1-(p-acetyl)amphetamine·hydrochloride
[1-(4′-(2-aminopropyl)]acetophenone hydrochloride To a mixture of 50 g. of aluminum chloride and 29 g. of acetyl chloride in 65 ml. of nitrobenzene is added dropwise 17 g. of l-amphetamine over a period of twenty minutes while maintaining the temperature at 10–15°. After stirring at 25° for 16 hours and standing for 12 days at 5°, the black reaction mixture is poured onto 400 g. of crushed ice and extracted twice with 200 ml. of ether.

The aqueous layer is made alkaline with concentrated sodium hydroxide and extracted twice with 200 ml. of chloroform. The combined chloroform extracts are dried over sodium sulfate and the solvent is removed in vacuo. The dark brown oily residue is taken up with 50 ml. of ethyl acetate and passed over alumina, ethyl acetate being used as an eluent. Twelve fractions, 50 ml. each, are collected. The fractions 1 to 4 contained predominantly the new product as an acetamide. Fractions 5–12 are combined, and the solvent is evaporated in vacuo. To the solution of this residue in 50 ml. of acetonitrile is introduced hydrogen chloride gas to a pH of 2.0. Upon cooling 4.3 g. of 1-(p-acetyl)amphetamine hydrochloride as off-white crystals are obtained, M.P. 142–148°, $[\alpha]_D^{25} = -1.5$, c.=0.75, water. Recrystallization from isopropanol gives analytically pure crystals, M.P. 153–155°, $[\alpha]_D^{25} = -2.8$, c.=1.03, water.

Analysis for $C_{11}H_{16}NOCl$: Calcd.: C, 61.82; H, 7.55; N, 6.55; Cl, 16.59. Found: C, 61.66; H, 7.59; N, 6.37; Cl, 16.52, 16.48.

Infrared spectra, $\nu_{max.}^{Nujol}$: 1677 (v.s.), 1271 (v.s.), 1186 (m.), 856 (m.), 806 (s.) cm.$^{-1}$.

U.V. spectra, $\lambda_{max.}^{H_2O}$: 252 m$\mu$ (15,300), $\lambda$ min.: 220 m$\mu$ (1,750).

$\lambda_{max.}^{EtOH}$: 248 m$\mu$, (15,450), $\lambda$ min.: 219 m$\mu$, (2,000)

EXAMPLE 5

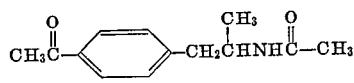

1-(p-acetyl)amphetacetamide
1-[4'-(2-acetamidopropyl)]acetophenone

The chromatographic fractions (1 to 4) from the 1-(p-acetyl) amphetamine preparation are combined and the solvent is removed in vacuo, leaving behind an almost colorless solid. Recrystallization of this material from benzene-cyclohexane (1:1) gives 0.7 g. of 1-(p-acetyl) amphetacetamide as white crystals, M.P. 94–95°, $[\alpha]_D^{25} = +7$, methanol. Repeated crystallization from ethyl acetate gives analytically pure, white crystals, M.P. 94–95°, $[\alpha]_D^{25} = +8$, c.=.65, methanol.

Analysis for $C_{13}H_{17}NO_2$: Calcd.: C, 71.20; H, 7.82; N, 6.39. Found: C, 71.48; H, 8.07; N, 6.32.

Infrared spectra, $\nu_{max.}^{Nujol}$: 3360 (v.s.), 1680 (v.s.), 1643 (v.s.), 1295 (w.), 1273 (s.), 1140 (m.), 844 (w.), 822 (m.), 722 (w.), cm.$^{-1}$.

U.V. spectra, $\lambda_{max.}^{EtOH}$: 252.5 m$\mu$ (15,800); $\lambda$ min.: 222 m$\mu$ (1,750).

EXAMPLE 6

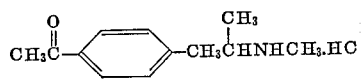

dl-(p-acetyl)desoxyephedrine hydrochloride [dl-4'-(2-methylaminopropyl)]acetophenone hydrochloride Acetyl chloride (58.5 g.) is added dropwise to the stirred solution of 46.2 g. of dl-desoxyephedrine hydrochloride and 100 g. of anhydrous aluminum chloride in 150 ml. nitrobenzene at 0°, stirred for two hours and allowed to stand at room temperature overnight. The dark reaction mixture is poured onto crushed ice extracted twice with 500 ml. ether and the extracts are discarded. The aqueous part is made basic with sodium hydroxide and extracted four times with 200 ml. of chloroform. The combined extracts are dried over sodium sulfate and the solvent is removed in vacuo. The residual oil is taken up with 150 ml. acetonitrile, hydrogen chloride is introduced to a pH of 2.0 followed by the addition of 200 ml. of anhydrous ether. On standing, a gummy off-white material separates which is recrystallized from methanol-acetonitrile to give 3.07 g. of dl-(p-acetyl)desoxyephedrine hydrochloride as white crystals, M.P. 175–178°. Concentration of the mother liquor to a low volume gives 14.7 g. of off-white crystals, M.P. 165–173°. Recrystallization of the first crop from acetonitrile gives analytically pure white crystals, M.P. 175–178°.

Analysis for $C_{12}H_{17}NO \cdot HCl$: Calcd.: C, 63.20; H, 7.96; N, 6.15. Found: C, 63.50; H, 7.99; N, 5.98.

U.V. spectra, $\lambda_{max.}^{EtOH}$: 250 m$\mu$ ($\epsilon$=14,400); $\lambda$ min.: 221 m$\mu$ ($\epsilon$=2,000).

Infrared spectra, $\nu_{max.}^{Nujol}$: 814 (s.); 861 (m.); 1269 (v.s.) 1608 (m.); 1682 (v.s.) cm.$^{-1}$.

EXAMPLE 7

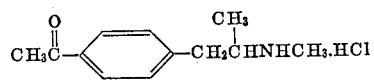

d-(p-Acetyl)desoxyephedrine hydrochloride d-[4'-(2-methylaminopropyl)]acetophenone hydrochloride Acetyl chloride (69 g.) is added dropwise to the stirred mixture of 43.0 g. of d-desoxyephedrine hydrochloride and 234 g. of anhydrous aluminum chloride in 400 ml. of nitrobenzene, stirred for sixteen hours and allowed to stand at room temperature for fifty hours. The infrared spectrum shows complete conversion. The reaction mixture is poured onto crushed ice, extracted with 500 ml. of ether, and the extract is discarded. The aqueous part is made basic with sodium hydroxide and extracted three times with 500 ml. of chloroform. The combined extracts are dried over sodium sulfate and the solvent is removed in vacuo. The oily residue is taken up with 100 ml. of absolute ethanol, hydrogen chloride is introduced to a pH of 2.0, to give after cooling, 18.35 g. of d-(p-acetyl) desoxyephedrine hydrochloride as off-white crystals, M.P. 209–212°, $[\alpha]_D^{25} = +8.0$, C.=1.3, water. Concentration of the mother liquor to a low volume gives 4.5 g. of off-white crystals, M.P. 209–212°, $[\alpha]_D^{25} = +7.2$, C.=0.8, water. Upon addition of ether to the mother liquor, additional quantity (14.6 g.) of off-white crystalline material, M.P. 193–207°, is obtained. Recrystallization of the first crop from acetonitrile gives analytically pure off-white crystals, M.P. 210–214°, $[\alpha]_D^{25} = +8.8$, C.=0.8, water.

Analysis for $C_{12}H_{17}NO \cdot HCl$: Calcd.: C, 63.29; H, 7.96; N, 6.15; Cl, 15.57. Found: C, 63.52; H, 8.06; N, 6.02; Cl, 15.43, 15.35.

U.V. spectra, $\lambda_{max.}^{EtOH}$ m$\mu$ ($\epsilon$) 248 (15,450), 283 (inflexion, 1,100). $\lambda$ min. 219 (1,720).
Infrared spectra, $\gamma_{max.}^{Nujol}$ 822 (s.), 860 (m.), 1268 (v.s.), 1608 (s.), 1683 (v.s.) cm.$^{-1}$.

EXAMPLE 8

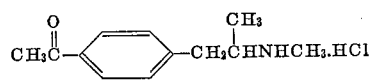

1-(p-acetyl)desoxyephedrine hydrochloride 1-4'-(2-methylaminopropyl)acetophenone hydrochloride To a stirred solution of 360 g. of anhydrous aluminum chloride in 400 ml. of nitrobenzene is added 211 g. of acetyl chloride over a period of 15 minutes, causing the temperature to rise to 50°. After the solution is cooled to 15°, 100 g. of 1-desoxyephedrine is added over a half-hour period and allowed to stir for twelve hours at room temperature. After an additional heating for five hours at 45–50°, the reaction mixture is cooled with ice-salt mixture and treated with cold water to decompose the excess $AlCl_3$ and the complex. The acidic solution is extracted twice with 400 ml. of ether, the extracts being discarded. The aqueous part is made basic with concentrated NaOH at 0°, taken up with one liter of ethyl acetate and filtered through the supercell. The two layers are separated and the aqueous layer extracted twice with 150 ml. of ethyl acetate. The combined organic extracts are dried over $Na_2SO_4$, treated with charcoal, and the solvent removed in vacuo. The residue is taken up with 400 ml. of acetone-isopropanol (1:1), and anhydrous hydrogen chloride is introduced to pH 2, to cause a tan colored, copious precipitate. After standing in the refrigerator overnight 42.3 g. of 1-(p-acetyl)desoxyephedrine hydrochloride as tan colored crystals is obtained, M.P. 204–208, $[\alpha]_D^{25}=-8.7$, c.=1.2, water. Concentration of the mother liquor to about 40 ml. and cooling gives 15.6 g. of an additional material, M.P. 203–206°. Recrystallization of the first crop from isopropanol gives 17.4 g. of analytically pure off-white crystals, M.P. 208–209°, $[\alpha]_D^{25}=-9.6$, c.=1.3, water.

Analysis for $C_{12}H_{17}NO \cdot HCl$: Calcd.: C, 63.29; H, 7.97; Cl, 15.57. Found: C, 63.23; H, 8.11; Cl, 15.72, 15.51.

U.V. spectra, $\lambda_{max}^{EtOH}$ m$\mu$ ($\epsilon$) 246 (15,250), 284 (inflexion, 1,200), $\lambda$ min. 220 (2,150).
Infrared spectra, $\gamma_{max}^{Nujol}$ 812 (s.), 859 (m.), 1267 (v.s.), 1608 (s.), 1683 (v.s.) cm.$^{-1}$.

EXAMPLE 9

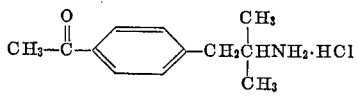

p-Acetylphentermine hydrochloride [4'-(2-amino-2-methylpropyl)]acetophenone hydrochloride Acetyl chloride (45.0 g.) is added dropwise to the stirred mixture of 22.0 g. of phentermine hydrochloride and 78.0 g. of anhydrous aluminum chloride in 200 ml. of nitrobenzene and allowed to stir for 24 hours at room temperature. The dark reaction mixture is poured onto crushed ice and extracted twice with 300 ml. of ether. The aqueous part is made basic with sodium hydroxide and extracted three times with methylene chloride. The combined extracts are dried with sodium sulfate, treated with charcoal, and the solvent is removed in vacuo. The residue is dissolved in 50 ml. of acetone, dry hydrogen chloride is introduced to a pH of 2.0, and the total product is precipitated by the addition of anhydrous ether. Crystallization from ethyl acetate gives 16.35 g. of p-acetylphentermine hydrochloride as greyish crystalline material, M.P. 203–205°. Two recrystallizations from acetonitrile-methanol, and acetonitrile, respectively gives analytically pure white crystals, M.P. 212–214°.

Analysis for $C_{12}H_{17}NO \cdot HCl$: Calcd.: C, 63.29; H, 7.96; N, 6.15; Cl, 15.37. Found: C, 63.16; H, 7.93; N, 6.21; Cl, 15.58.

U.V. spectra, $\lambda_{max}^{EtOH}$: 247.5 m$\mu$ ($\epsilon$=15,850); $\lambda$ min: 219 m$\mu$ ($\epsilon$=2,550).
Infrared spectra, $\gamma_{max}^{Nujol}$: 832 (m.); 860 (m.); 1270 (s.); 1608 (s.); 1675 (v.s.) cm.$^{-1}$.

EXAMPLE 10

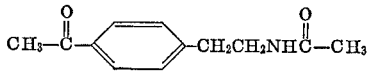

N-(p-acetylphenethyl)acetamide (4'-[2-(acetamido)ethyl]acetophenone)

A solution of 11.0 g. of p-acetylphenethylamine in 20 ml. of glacial acetic acid is treated with 30 ml. of acetic anhydride at 0°. After standing in the refrigerator overnight, the solution is poured onto 300 g. of crushed ice, made basic with sodium hydroxide, and extracted twice with 150 ml. of methylene chloride. The combined extracts are washed twice with 5% hydrochloric acid, dried over sodium sulfate and the solvent is removed in vacuo leaving 12.0 g. of N-(p-acetylphenethyl)acetamide as a yellowish solid, M.P. 95–100°. Recrystallization from ethyl acetate gives analytically pure white crystals, M.P. 104–106°, without decomposition.

Analysis for $C_{12}H_{15}NO_2$: Calcd.: C, 70.22; H, 7.39; N, 6.82. Found: C, 70.48; H, 7.50; N, 6.55.

Infrared spectra, $\nu_{max}^{Nujol}$: 3300 (s.), 1672 (v.s.), 1643 (v.s.), 1265 (s.), 1198 (m.), 845 (m.), 823 (m.) cm.$^{-1}$.
U.V. spectra, $\lambda_{max}^{EtOH}$: 252 m$\mu$ (15,300); $\lambda$ min: 222 (1,350).

EXAMPLE 11

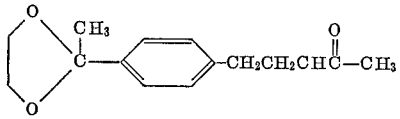

p-(2-methyl-1,3-dioxolan-2-yl)phenethylacetamide

The procedure similar to that of Sugasawa and Itoh is followed (see Tetrahedron Letters, 6, 16 (1959). A solution of 14.0 g. of p-acetylphenethylacetamide, 4.5 g. of ethylene glycol, and 1.5 g. of p-toluenesulfonic acid is refluxed for four hours, while 1.23 ml. of water is collected in the Dean-Stark tube. The solution is concentrated to ca. 100 ml., cooled, washed with 30 ml. of 5% aqueous sodium hydroxide, and dried over sodium sulfate. After the removal of the solvent in vacuo, the resulting off-white cake is recrystallized from ether to give 9.3 g. of p-(2-methyl-1,3-dioxolan-2-yl)phenethylacetamide as analytically pure, white crystals, M.P. 79–84°. Concentration of the mother liquor gives 2.8 g. of additional material, M.P. 78–83°.

Analysis for $C_{14}H_{19}NO_3$: Calcd.: C, 67.44; H, 7.68; N, 5.62. Found: C, 67.70; H, 7.67; N, 5.36.

U.V. spectra, $\lambda_{max}^{EtOH}$: 215 m$\mu$ (inflexion, $\epsilon$=10,000); 252 m$\mu$ ($\epsilon$=2,900); $\lambda$ min.: 230 m$\mu$ ($\epsilon$=950):
Infrared spectra, $\gamma_{max}^{Nujol}$: 3350 (s.); 1648 (v.s.); 1198 (s.); 1100 (s.); 1132 (v.s.) cm.$^{-1}$.

EXAMPLE 12

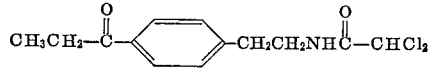

2,2-dichloro-N-(p-propionylphenethyl)acetamide (4'-[2-(2,2-dichloroacetamido)ethyl])propionphenone A suspension of 8.0 g. of p-(propionyl)phenethylamine hydrochloride in 75 ml. of ethylene dichloride is treated at 0° with 12 ml. of 40% aqueous sodium hydroxide and stirred until all solid is dissolved. The two-phased solution is cooled to −10° and 5.5 g. of dichloroacetamide in 15 ml. of ethylene dichloride is added dropwise at 0° over a period of 15 minutes. Water (50 ml.) is added and the two phases are separated. The organic phase is washed twice with 30 ml. of 10% hydrochloric acid and then with 40 ml. water, and, finally, with 25 ml. of 5% potassium carbonate. After drying with sodium sulfate the solvent is removed in vacuo, to leave behind 7.4 g. of 2,2-dichloro-N-(p-propionylphenethyl) acetamide as a faint yellow cake, M.P. 104–105°. Recrystallization from absolute ethanol gives analytically pure, off-white crystals, M.P. 106–107°.

Analysis for $C_{13}H_{15}NCl_2O_2$: Calcd.: C, 54.18; H, 5.25; N, 4.86. Found: C, 54.38; H, 5.40; N, 5.05.

U.V. spectra, $\lambda_{max}^{EtOH}$: 250 m$\mu$ ($\epsilon$=15,550); $\lambda$ min: 223 m$\mu$ ($\epsilon$=4,050).
Infrared spectra, $\gamma_{max}^{Nujol}$: 3240 (s.); 3080 (m.); 1678 (v.s.); 1665 (v.s.); 1222 (s.); 819 (s.); 800 (s.); cm.$^{-1}$.

It is understood that the foregoing detailed description is given merely by way of illustration and that many variations may be made therein without departing from the spirit of our invention.

Having described our invention, what we desire to secure by Letters Patent is:

1. A member selected from the group consisting of the free base of the formula:

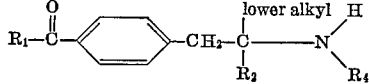

wherein $R_1$ is a member selected from the group consisting of lower alkyl and cycloalkyl; and $R_2$, and $R_4$ each represents a member selected from the group consisting of hydrogen and lower alkyl and the acid addition salts thereof.

2. β-(p-Acetylphenyl)ethylamine and its acid addition salts thereof.

3. β-(p-Propionylphenyl)ethylamine and its acid addition salts thereof.

4. p-Cyclohexylcarbonylphenethylamine and its acid addition salts thereof.

5. 1-(p-acetyl)amphetamine and its acid addition salts thereof.

6. dl-(p-Acetyl)desoxyephedrine and its acid addition salts thereof.

7. d-(p-Acetyl)desoxyephedrine and its acid addition salts thereof.

8. l-(p-acetyl)desoxyephedrine and its acid addition salts thereof.

9. p-Acetylphentermine and its acid addition salts thereof.

References Cited

UNITED STATES PATENTS 2,636,036    4/1953    Du Bois et al. _____ 260—570.8 X

OTHER REFERENCES

Ishidate et al.: "Chemical Abstracts," vol. 49, p. 12359 (1955).

Wagner et al.: "Synthetic Organic Chemistry," pp. 317–19 (1953).

ROBERT V. HINES, *Primary Examiner.*

U.S. Cl. X.R.

260—340.9, 561; 424—330